US008664589B2

(12) United States Patent
Clem et al.

(10) Patent No.: US 8,664,589 B2
(45) Date of Patent: Mar. 4, 2014

(54) SPECTROSCOPY DATA DISPLAY SYSTEMS AND METHODS

(75) Inventors: William E. Clem, Bozeman, MT (US); Jay N. Wilkins, Belgrade, MT (US); Leif Summerfield, Bozeman, MT (US)

(73) Assignee: Electro Scientific Industries, Inc, Portland, OR (US)

( * ) Notice: Subject to any disclaimer, the term of this patent is extended or adjusted under 35 U.S.C. 154(b) by 0 days.

(21) Appl. No.: 13/340,011

(22) Filed: Dec. 29, 2011

(65) Prior Publication Data

US 2013/0168545 A1 Jul. 4, 2013

(51) Int. Cl.
*B01D 59/44* (2006.01)

(52) U.S. Cl.
USPC .......................................... 250/282; 250/281

(58) Field of Classification Search
None
See application file for complete search history.

(56) References Cited

U.S. PATENT DOCUMENTS

| | | | | |
|---|---|---|---|---|
| 6,949,740 | B1 * | 9/2005 | Sheehan et al. | 250/288 |
| 6,989,528 | B2 * | 1/2006 | Schultz et al. | 250/281 |
| 7,270,948 | B2 * | 9/2007 | Demirev et al. | 435/4 |
| 7,525,105 | B2 | 4/2009 | Kovtoun | |
| 7,629,576 | B2 * | 12/2009 | Schultz et al. | 250/287 |
| 7,663,749 | B2 | 2/2010 | Lévesque et al. | |
| 7,816,646 | B1 * | 10/2010 | Willoughby et al. | 250/288 |
| 8,199,321 | B2 * | 6/2012 | Yoo et al. | 356/318 |
| 2003/0084409 | A1 * | 5/2003 | Abt et al. | 716/1 |
| 2005/0035284 | A1 * | 2/2005 | Schultz et al. | 250/287 |
| 2005/0056776 | A1 * | 3/2005 | Willoughby et al. | 250/281 |
| 2006/0138317 | A1 * | 6/2006 | Schultz et al. | 250/287 |
| 2006/0207115 | A1 * | 9/2006 | Truche et al. | 33/286 |
| 2007/0097369 | A1 | 5/2007 | Shimada | |
| 2008/0067358 | A1 * | 3/2008 | Musselman | 250/290 |
| 2008/0192246 | A1 * | 8/2008 | Neiss et al. | 356/301 |
| 2009/0180114 | A1 | 7/2009 | Fujii et al. | |
| 2009/0272893 | A1 * | 11/2009 | Hieftje et al. | 250/282 |
| 2009/0273782 | A1 * | 11/2009 | Yoo et al. | 356/318 |
| 2010/0072645 | A1 * | 3/2010 | Hiromatsu et al. | 264/21 |
| 2010/0090101 | A1 * | 4/2010 | Schultz et al. | 250/282 |
| 2010/0301013 | A1 * | 12/2010 | Conneely et al. | 216/83 |
| 2011/0011190 | A1 * | 1/2011 | Subramaniam | 73/866.5 |
| 2011/0240839 | A1 | 10/2011 | Hutchinson et al. | |
| 2011/0242307 | A1 | 10/2011 | Summerfield et al. | |

FOREIGN PATENT DOCUMENTS

JP 2010054391 A 3/2010

OTHER PUBLICATIONS

Notification of Transmittal of the International Search Report and the Written Opinion of the International Searching Authority, or the Declaration for PCT/US12/71311, International Filing Date Dec. 21, 2012.

* cited by examiner

*Primary Examiner* — Andrew Smyth
(74) *Attorney, Agent, or Firm* — Stoel Rives LLP

(57) ABSTRACT

Spectroscopy data are correlated to physical locations on a sample. A laser beam is scanned along a beam trajectory relative to the sample located in a sample chamber. The laser beam disassociates material from the sample along the beam trajectory to produce an aerosol of the disassociated material within the sample chamber. A fluid is passed through the sample chamber to transport the disassociated material to a spectrometer for determining spectroscopy data values of a selected element along the beam trajectory. The spectroscopy data values are correlated with respective locations of the sample along the beam trajectory, and an image is displayed of at least a portion of the sample including the respective locations along the beam trajectory where the material was disassociated by the laser beam. The image includes indicia of the spectroscopy data values at their correlated locations.

27 Claims, 7 Drawing Sheets

SPECTROSCOPY DATA DISPLAY SYSTEMS AND METHODS

TECHNICAL FIELD

This disclosure relates to spectrometer systems. In particular, this disclosure relates to directly correlating spectroscopy data to physical locations on a sample and overlaying indicia of the spectroscopy data over an image of the sample at the corresponding locations.

BACKGROUND INFORMATION

Mass spectroscopy is an analytical technique that measures the mass-to-charge ratio of charged particles for determining, for example, the elemental composition of a specimen or sample of matter. Laser-assisted spectroscopy (LAS) involves directing laser energy at a sample in order to disassociate its constituent parts and make them available to a spectrometer. LAS systems apply the laser energy to the sample while passing a fluid, typically an inert gas, over the sample to capture the disassociated species and carry them to a spectroscope for processing. Example LAS systems include laser ablation inductively coupled plasma mass spectroscopy (LA ICP-MS), laser ablation inductively coupled plasma emission spectroscopy (ICP-OES/ICP-AES) and laser induced breakdown spectroscopy (LIBS).

In certain LAS systems, a laser beam path moves along a beam trajectory (e.g., the laser beam may be deflected relative to sample and/or the sample may be moved relative to the laser beam using motion stages) to ablate material from a selected portion or portions of the sample for analysis. For example, FIG. 1 is a simplified schematic diagram of a sample 100 including a kerf 110 cut by a laser beam. In this example, the beam trajectory along the kerf 110 is in a direction indicated by arrow 112. The sample 100 may include more than one type of material and the composition or respective concentrations of elements may change along the kerf 110. However, mass spectrometers generally output data as tabulated text or in spreadsheet formats that do not correspond to physical locations of the sample 100. The mass spectroscopy data may be displayed in the form of numbers and graphs. For example, FIG. 2 illustrates example graphs of mass spectroscopy data for various elements measured for the sample 100 shown in FIG. 1. In this example, concentrations are graphed with respect to time for selected nuclides of Sulfur (S32), Calcium (Ca44), Manganese (Mn55), Zinc (Zn66), Mercury (Hg202), Lead (Pb208), and Bismuth (Bi209). A problem with the graphs shown in FIG. 2 is that there is no correlation to physical locations on the surface of the sample 100 relative to where the material was extracted for generating the displayed data.

SUMMARY OF THE DISCLOSURE

Spectroscopy data are correlated to physical locations on a sample. In one embodiment, a method displays laser-assisted spectroscopy data of a sample specimen. The method includes scanning a laser beam along a beam trajectory relative to the sample. The sample is located in a sample chamber during the scanning. The laser beam disassociates material from the sample along the beam trajectory to produce an aerosol of the disassociated material within the sample chamber. The method also includes passing a fluid through the sample chamber to transport the disassociated material to a spectrometer for determining spectroscopy data values of a selected element along the beam trajectory. The method further includes correlating the spectroscopy data values with respective locations of the sample along the beam trajectory, and displaying an image of at least a portion of the sample including the respective locations along the beam trajectory where the material was disassociated by the laser beam. The image includes indicia of the spectroscopy data values at their correlated locations.

In another embodiment, a laser-assisted spectroscopy system includes a sample chamber for holding a sample specimen, a laser source for producing a laser beam, and a scanning subsystem for scanning the laser beam along a beam trajectory relative to the sample. The laser beam disassociates material from the sample along the beam trajectory to produce an aerosol of the disassociated material within the sample chamber. A fluid passing through the sample chamber transports the disassociated material to a spectrometer for determining spectroscopy data values of a selected element along the beam trajectory. The system also includes a processor for controlling the scanning subsystem and for correlating the spectroscopy data values with respective locations of the sample along the beam trajectory. The system further includes a display device for displaying an image of at least a portion of the sample including the respective locations along the beam trajectory where the material was disassociated by the laser beam. The image includes indicia of the spectroscopy data values at their correlated locations.

Additional aspects and advantages will be apparent from the following detailed description of preferred embodiments, which proceeds with reference to the accompanying drawings.

DETAILED DESCRIPTION OF PREFERRED EMBODIMENTS

Figure 1:
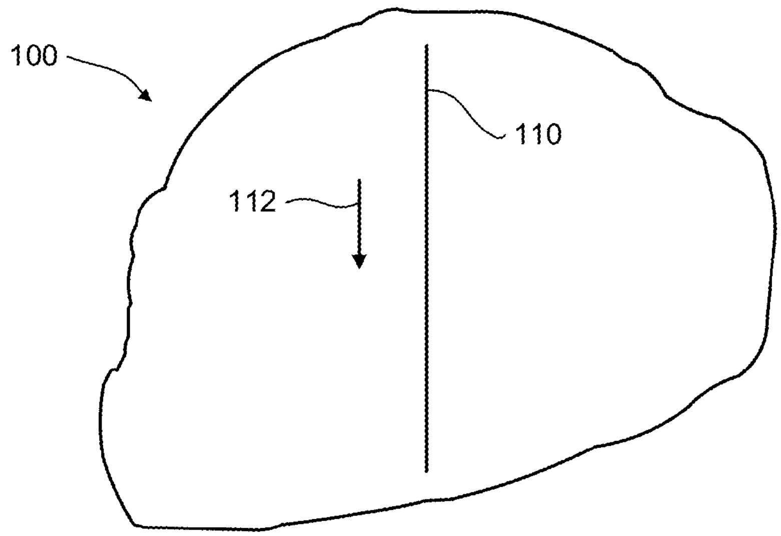
FIG. 1 (Prior Art)
FIG. 1 is a simplified schematic diagram of a sample including a kerf cut by a laser beam.
Figure 2:
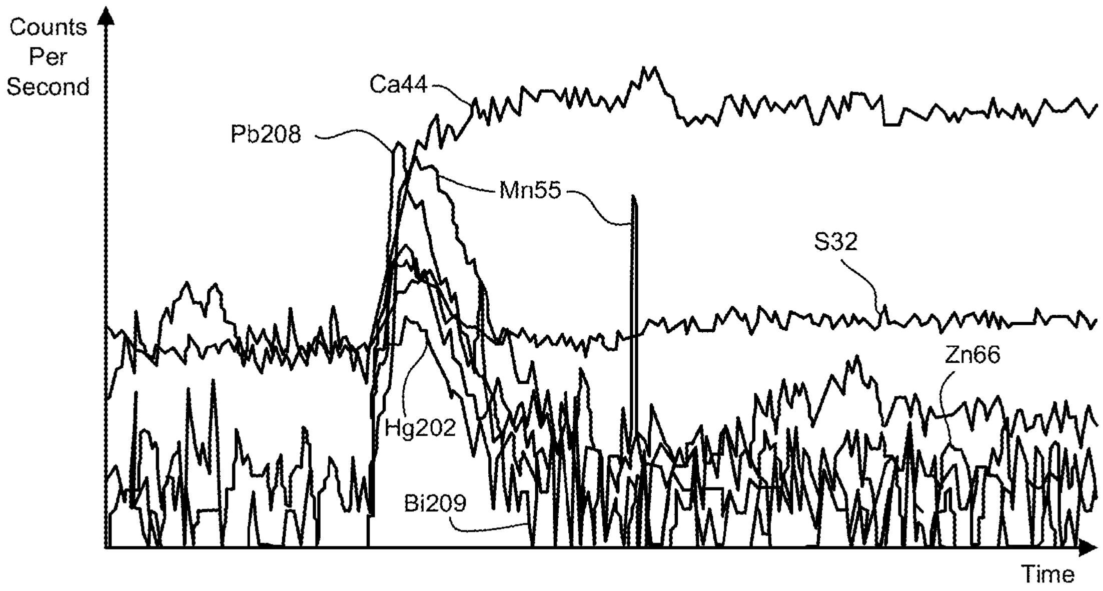
FIG. 2 (Prior Art)
FIG. 2 illustrates example graphs of mass spectroscopy data for various elements measured for the sample shown in FIG. 1.

Spectroscopy data are correlated to physical locations on a sample. The correlation may use, for example, location data (e.g., X, Y, and/or Z data) of a laser beam trajectory along a surface (or below the surface) of the sample, scan velocity data, and system delay data to accurately match spectrometer output to geographic locations on or within the sample. The spectroscopy data may include elemental concentrations and/or detector responses associated with concentrations such as volts, counts, counts per second, frequency, and wavelength. The spectroscopy data may also include ratios of responses such as elemental ratios or isotropic ratios. In certain embodiments, the spectroscopy data is acquired using a laser-assisted spectroscopy (LAS) system such as laser ablation inductively coupled plasma mass spectroscopy (LA ICP-MS), laser ablation inductively coupled plasma emission spectroscopy (ICP-OES/ICP-AES), and laser induced breakdown spectroscopy (LIBS)

Indicia of the spectroscopy data are directly displayed on an image of the sample at locations corresponding to the extraction of material from the sample for processing. The displayed indicia may include, for example, color variation, hue variation, brightness variation, pattern variation, symbols, text, combinations of the foregoing, and/or other graphical representations of spectroscopy data with respect to geographic locations on or within the sample. In certain embodiments, the indicia of spectroscopy data are overlaid on the image of the sample in real time as material is being ablated by the laser beam and processed by the spectrometer. In addition, or in other embodiments, the indicia may be overlaid on the image any time after the spectroscopy data has been generated. In certain such embodiments, one or more fiducial marks may be added to the sample and/or to the image of the sample for later alignment of the indicia of the spectroscopy data with the physical geography of the sample.

In certain embodiments, a graphical user interface includes a layered environment that selectively represents the graphical buildup of various layers of information corresponding to one or more samples. For example, the user may be allowed to select the display of a layer representing an empty sample chamber where a laser induced aerosol may be produced, a layer representing an insert loaded with one or more samples within the sample chamber, a layer representing sample maps from one or more system cameras, a layer representing images imported from other systems or devices (e.g., petrographic microscope systems, scanning electron microscope (SEM) systems, or other imaging systems), a layer representing annotation, and/or a layer representing the indicia of spectroscopy data. Artisans will recognize from the disclosure herein that other layers may also be used. In certain embodiments, the entire layered environment can be saved to enable the user to load saved environments at a later time and recall all of the information associated with a particular experiment (e.g., scan positions, SEM data, spectrometer raw data, reduced data such as age of the particular sample, and other data used in the experiment). As the user scans across the environment, respective data and data files become available for viewing, which enables traceability of the various aspects of the experiment and reduces or negates the requirement for the user to keep separate records. In certain embodiments, mobile device applications (e.g., for laptop computers, tablet computers, smart phones, or other mobile devices) allow the user to review selected environments at any time.

Reference is now made to the figures in which like reference numerals refer to like elements. For clarity, the first digit of a reference numeral indicates the figure number in which the corresponding element is first used. In the following description, numerous specific details are provided for a thorough understanding of the embodiments disclosed herein. However, those skilled in the art will recognize that the embodiments can be practiced without one or more of the specific details, or with other methods, components, or materials. Further, in some cases, well-known structures, materials, or operations are not shown or described in detail in order to avoid obscuring aspects of the invention. Furthermore, the described features, structures, or characteristics may be combined in any suitable manner in one or more embodiments.

Embodiments may include various steps, which may be embodied in machine-executable instructions to be executed by a general-purpose or special-purpose computer (or other electronic device). Alternatively, the steps may be performed by hardware components that include specific logic for performing the steps or by a combination of hardware, software, and/or firmware.

Embodiments may also be provided as a computer program product including a non-transitory, machine-readable medium having stored thereon instructions that may be used to program a computer (or other electronic device) to perform the processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/computer-readable medium suitable for storing electronic instructions.

Figure 3:
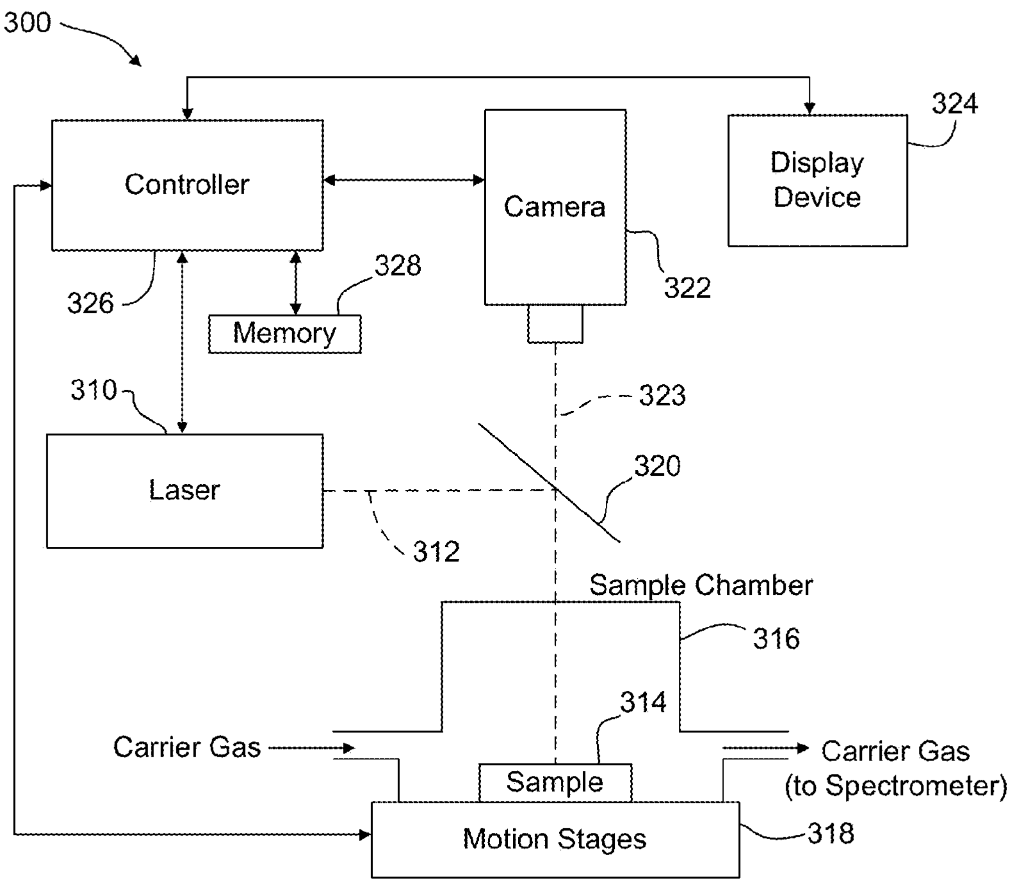
FIG. 3 is a block diagram of a laser ablation sampling system according to one embodiment.

FIG. 3 is a block diagram of a laser ablation sampling system 300 according to one embodiment. The system 300 includes a laser 310 to produce a laser beam 312 directed to a sample 314 within a sample chamber 316. By way of example, and not by limitation, the sample 314 may comprise bone, rock or other geological material, paint, varnish, pigment, metal, ceramic, glass, paper, textiles, or other types of materials. The laser beam 312 may include a plurality of laser pulses at a pulse repetition frequency, wavelength, pulse energy, and other laser parameters selected to ablate or otherwise dissociate material from the sample 314. Artisans will recognize from the disclosure herein that, in other embodiments, a continuous wave (CW) laser beam may be used. As illustrated, a stream of carrier gas enters the sample chamber 316 and picks up fine sample particles (e.g., in an aerosol) produced by the laser ablation process and transports them to a spectrometer (not shown) for processing. The carrier gas may include, for example, Argon, Helium, or another inert gas.

The sample chamber 316 is mounted on motion stages 318 that allow the sample to be moved relative to the laser beam 312 in three directions (X, Y, and Z). A mirror 320 may be used to direct the laser beam 312 to the sample 314. Although not shown in FIG. 3, other optics may also be used along the path of the laser beam 312 such as focusing optics (e.g., lenses) and beam steering optics (e.g., fast steering mirrors, mirror galvanometer deflectors, electro-optic deflectors, and/or acousto-optic deflectors). The mirror 320 may be configured (e.g., a half-silvered mirror) to combine the optical axes of the laser beam 312 with a field of view 323 of a camera 322. The camera 322 may provide still images and/or video of the sample 314 and/or sample chamber 316 for display on a display device 324. Although not shown, other imaging systems may also be used. For example, the system 300 may include one or more additional video cameras (e.g., for both high resolution and wide-angle views), petrographic microscope systems, and/or scanning electron microscope (SEM) systems. Further, more than one display device 324 may be used to allow a user to control the system 300 and view selected images of the sample 314 and/or sample chamber 316.

The system 300 further includes a controller 326 and a memory device 328. The controller 326 is configured to control the laser 310, the motion stages 318, the camera 322, and the display device 324. The controller 326 may also be used, in certain embodiments, to control other devices such as the spectrometer, petrographic microscope systems, scanning electron microscope (SEM) systems, or other imaging systems. An artisan will understand from the disclosure herein that more than one controller may also be used. The memory device 328 stores computer-executable instructions that may be read and executed by the controller 326 to cause the system 300 function as described herein. The memory device 328 may also store generated spectroscopy data, data for correlating the spectroscopy data with geographic locations on or within the sample 314, images and/or video of the sample 314 and/or sample chamber 316, other imported images and/or video, user generated annotations of the sample 314 and/or spectroscopy data, and other data associated with the processes described herein (e.g., scan positions, age and/or origin of the sample 314, report files, sample chamber parameters, laser parameters, and other experiment or ablation parameters).

In certain embodiments, a user may select a particular portion or portions of the sample 314 to ablate for examination. For example, the sample may be composed of more than one type of material and the user may desire to study only one of the materials or a selected group of materials. Thus, the user may define a laser beam path along a beam trajectory with respect to a surface of the sample 314. Thus, the beam trajectory may be defined in an X-Y plane. In addition, or in other embodiments, the laser beam trajectory may be in the Z direction (e.g., a direction parallel to the laser beam as it drills into the sample). The user may define one more single spots, a line of distinct spots, a grid of distinct spots, a line of continuous ablation (e.g., overlapping laser spots creating a continuous kerf such as the kerf 110 shown in FIG. 1), and/or a raster pattern covering a two-dimensional (2D) area of the sample 314. In certain embodiments, multiple passes of the laser beam 312 along the same spot, line, or raster pattern may be used to cut deeper into the sample 314 so as to generate three-dimensional (3D) spectroscopy data.

Figure 4A:
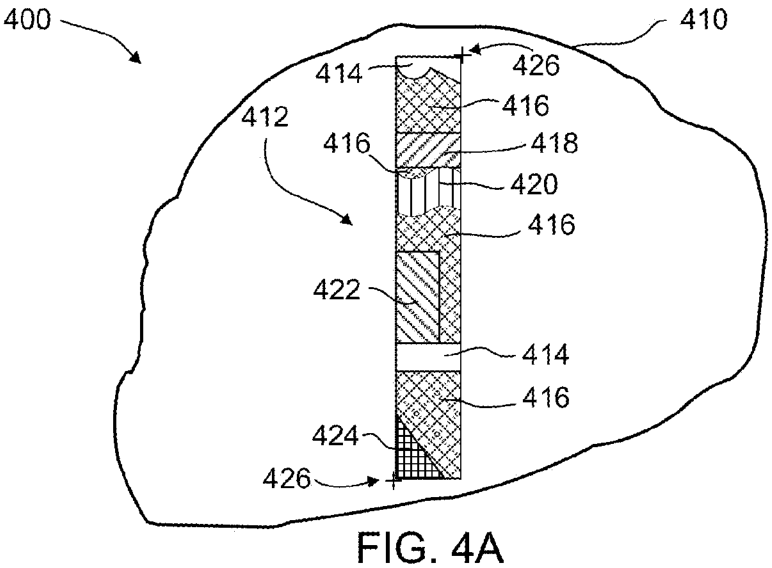
FIG. 4A is a simplified schematic diagram of a composite image that may be displayed, for example, on the display device shown in FIG. 3 according to one embodiment.

FIG. 4A is a simplified schematic diagram of a composite image 400 that may be displayed, for example, on the display device 324 shown in FIG. 3 according to one embodiment. The composite image 400 includes an image 410 of the sample 314 shown in FIG. 3 (or a portion of the sample 314) overlaid with indicia 412 of spectroscopy data. The indicia 412 of spectroscopy data are correlated to actual locations within a 2D area of a surface of the sample 314 where laser ablation was used to generate the spectroscopy data. The 2D area may correspond, for example, to a plurality of adjacent or partially overlapping, vertical passes of the laser beam 312 (as opposed to the single, vertical pass the width of the laser beam spot size used to produce the kerf 110 shown in FIG. 1) to produce a widened kerf in the horizontal direction.

In the simplified example shown in FIG. 4A, different fill patterns (e.g., diamond-shaped hatch, slanting lines, vertical lines, square-shaped hatch, or no-fill) are used to distinguish variations in spectroscopy data (e.g., concentrations in parts per million (ppm), counts, counts per second, volts, frequency, wavelength, elemental ratios, and/or isotropic ratios) of a selected element within the 2D area. For example, a first range of concentrations (or counts, etc.) is indicated in areas 414, a second range of concentrations is indicated in areas 416, a third range of concentrations is indicated in area 418, a fourth range of concentrations is indicated in area 420, a fifth range of concentrations is indicated in area 422, and a sixth range of concentrations is indicated in area 424. Although not shown in FIG. 4A, a legend or other indication of the particular concentration ranges or other spectroscopy data associated with each fill pattern may also be displayed.

In certain embodiments, one or more fiducial marks are added to the sample and/or the image of the sample so as to correctly align the indicia of the spectroscopy data either in real time as the spectroscopy data is being generated or at a later time. For example, the laser beam used for disassociating the material from the sample (e.g., the sample 314 shown in FIG. 3) may also be used to add fiducial marks to the sample for later reference. Thus, the indicia of the spectroscopy data may be overlaid on later acquired images of the sample. As another example, FIG. 4A shows fiducial marks 426 (two shown) added to the image 410 of the sample. The fiducial marks 426 may be used to align the indicia 412 over the image 410 during the laser ablation process as the spectroscopy data is generated and/or at a later time, as selected by the user.

Figure 4B:
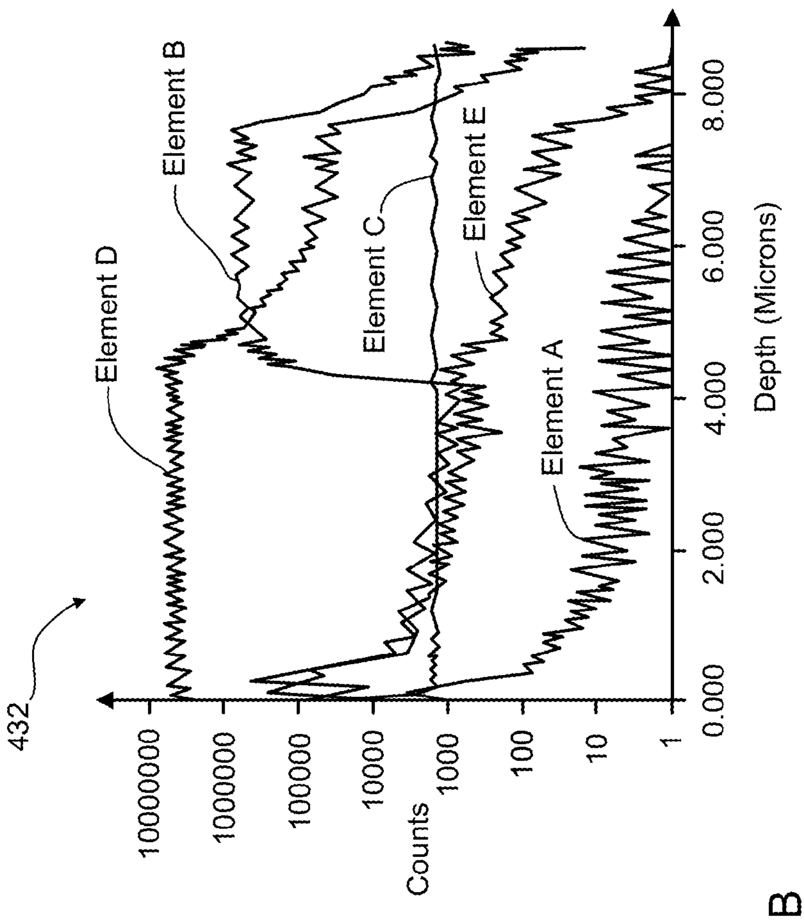
FIG. 4B is a simplified schematic diagram of an image that may be displayed, for example, on the display device shown in FIG. 3 according to another embodiment.
Figure 4B:
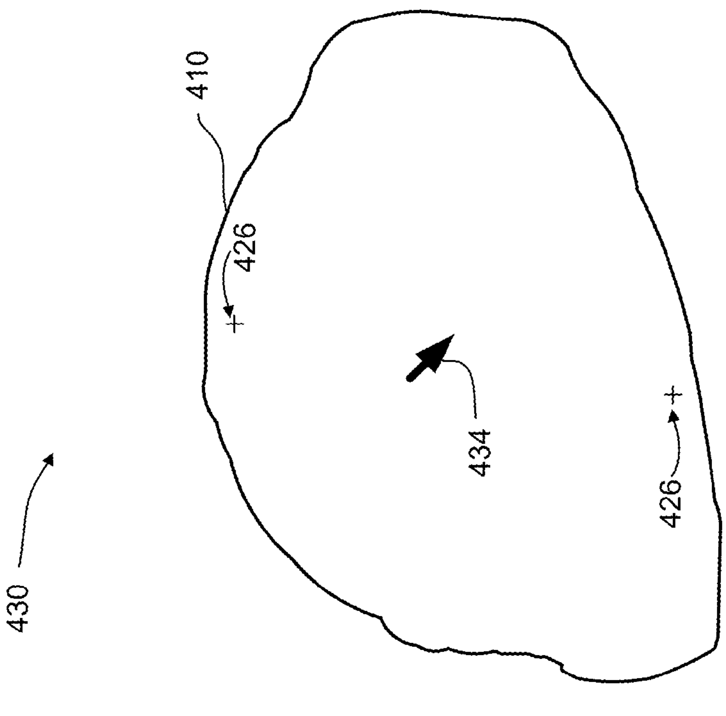

FIG. 4B is a simplified schematic diagram of an image 430 that may be displayed, for example, on the display device 324 shown in FIG. 3 according to another embodiment. The image 430 includes an image 410 of the sample 314 shown in FIG. 3 (or a portion of the sample 314) and graphs 432 showing spectroscopy data (e.g., counts) versus depth for various elements (labeled element A, element B, element C, element D, and element E). The sample image 410 and the graphs 432 may be displayed together, for example, in a split screen or picture-in-picture format. The displayed sample image 410 includes the fiducial marks 426 discussed above. The graphs 432 show changes in spectroscopy data at a selected X, Y location for different depths in the Z direction. In the example shown in FIG. 4B, the X, Y location is in a plane corresponding to the displayed sample image 410 and the Z direction is perpendicular to the plane (e.g., extending into the sample). The Z direction may also be considered as being parallel to the laser beam at the sample.

In certain embodiments, a user may position a cursor 434 over the displayed sample image 430 to select the X, Y position at which spectroscopy data is displayed for various depths in the Z direction. In such embodiments, the displayed graphs 432 change as the user moves ("mouses over") the cursor 434 over the displayed sample image 410. The spectroscopy data at different depths may be acquired, for example, by making multiple passes of the laser beam along the same kerf or by using multiple pulses to drill down into the sample at a selected location. Information regarding the amount (depth) of material removed by each laser pass or each laser pulse is used to correlate the spectroscopy data to a Z location within the sample.

Figure 5:
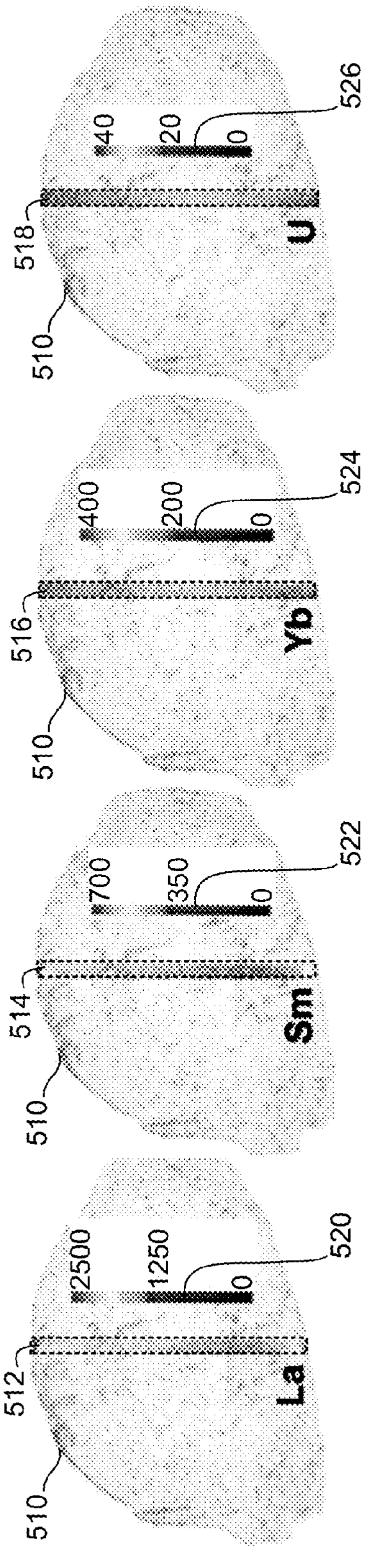
FIG. 5 illustrates four composite images of a sample with indicia of correlated spectroscopy data according to one embodiment.

In other embodiments, continuous changes (e.g., rather than discrete ranges) in spectroscopy data may be indicated using, for example, a continuous spectrum of colors, shades, or hues. For example, FIG. 5 illustrates four composite images of a sample 510 with indicia of correlated spectroscopy data 512, 514, 516, 518 according to one embodiment. For illustrative purposes, the spectroscopy data 512, 514, 516, 518 is shown in FIG. 5 as various shades of gray within a 2D area surrounded by a dashed line. In certain embodiments, however, a continuous spectrum of colors is used to represent variations in spectroscopy data, and the dashed line (or a solid) line may not be used because the colors sufficiently distinguish the sample image from the spectroscopy data.

In a first image shown in FIG. 5, the overlying spectroscopy data 512 represents the concentration of Lanthanum (La) within a 2D area of the sample 510, and a displayed legend 520 indicates that the concentration of Lanthanum within the 2D area ranges between 0 ppm and 2,500 ppm. Applying the spectrum of colors, for example, 0 ppm may be represented by black with trace amounts represented by violet. Similarly, Lanthanum in concentrations of about 1250 ppm may be represented by green (e.g., near the center of the visible spectrum between violet and red), and Lanthanum concentrations of about 2500 ppm may be represented by red. Artisan's will recognize that any relationship (e.g., linear or non-linear) between concentrations and colors may also be used, and that ranges of concentrations may be assigned to a single color (e.g., concentrations between 2200 ppm and 2500 ppm may all be represented by red).

In a second image of the sample 510, the overlying spectroscopy data 514 represents the concentration of Samarium (Sm) within the 2D area of the sample, and a displayed legend 522 indicates that the concentration of Samarium within the 2D area ranges between 0 ppm and 700 ppm. In certain embodiments, the concentrations for different elements are not represented by the same colors. For example, whereas red represents a maximum of about 2500 ppm in the first image, red represents a maximum of about 700 ppm in the second image. In a third image of the sample 510, the overlying spectroscopy data 516 represents the concentration of Ytterbium (Yb) within the 2D area of the sample, and a displayed legend 524 indicates that the concentration of Ytterbium within the 2D area ranges between 0 ppm and 400 ppm. In a fourth image of the sample 510, the overlying spectroscopy data 518 represents the concentration of Uranium (U) within the 2D area of the sample, and a displayed legend 526 indicates that the concentration of Uranium within the 2D area ranges between 0 ppm and 40 ppm.

Figure 6:
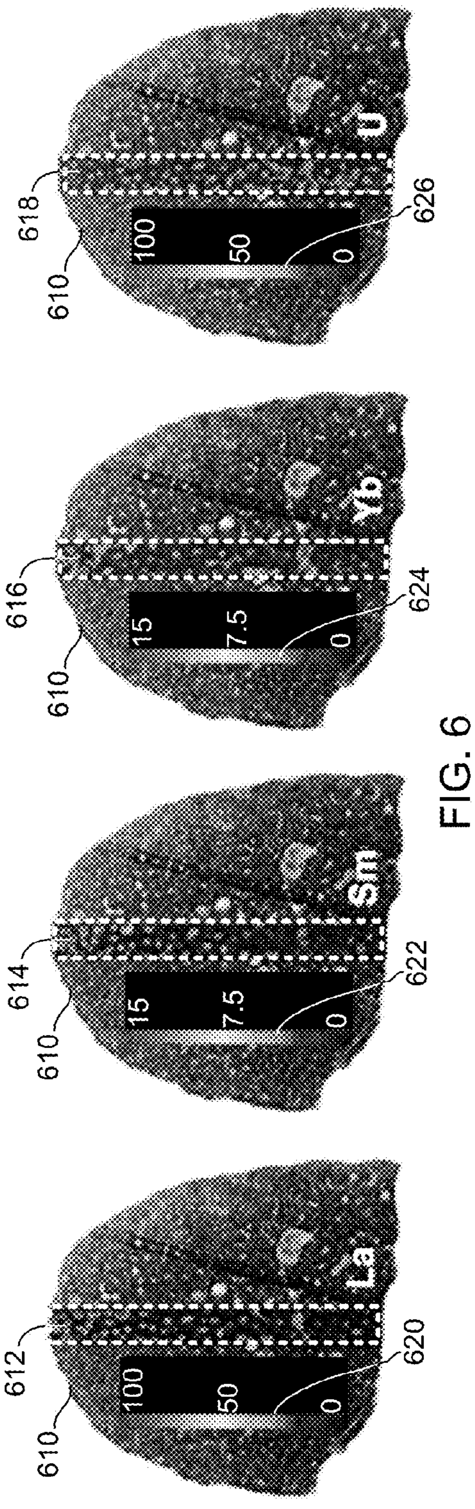
FIG. 6 illustrates four composite images of a sample with indicia of correlated spectroscopy data according to one embodiment.

FIG. 6 illustrates four composite images of a sample 610 with indicia of correlated spectroscopy data 612, 614, 616, 618 according to one embodiment. As in FIG. 5, the spectroscopy data 612, 614, 616, 618 is shown in FIG. 6 as various shades of gray within a 2D area surrounded by a dashed line. In other embodiments, however, a continuous spectrum of colors is used to represent variations in spectroscopy data. Similar to FIG. 5, FIG. 6 includes a first image where the spectroscopy data 612 represents the concentration of Lanthanum (La), a second image where the spectroscopy data 614 represents the concentration of Samarium (Sm), a third image where the spectroscopy data 616 represents the concentration of Ytterbium (Yb), and a fourth image where the spectroscopy data 618 represents the concentration of Uranium (U). Each of the composite images includes a legend 620, 622, 624, 626 corresponding to the respective concentrations.

Figure 7:
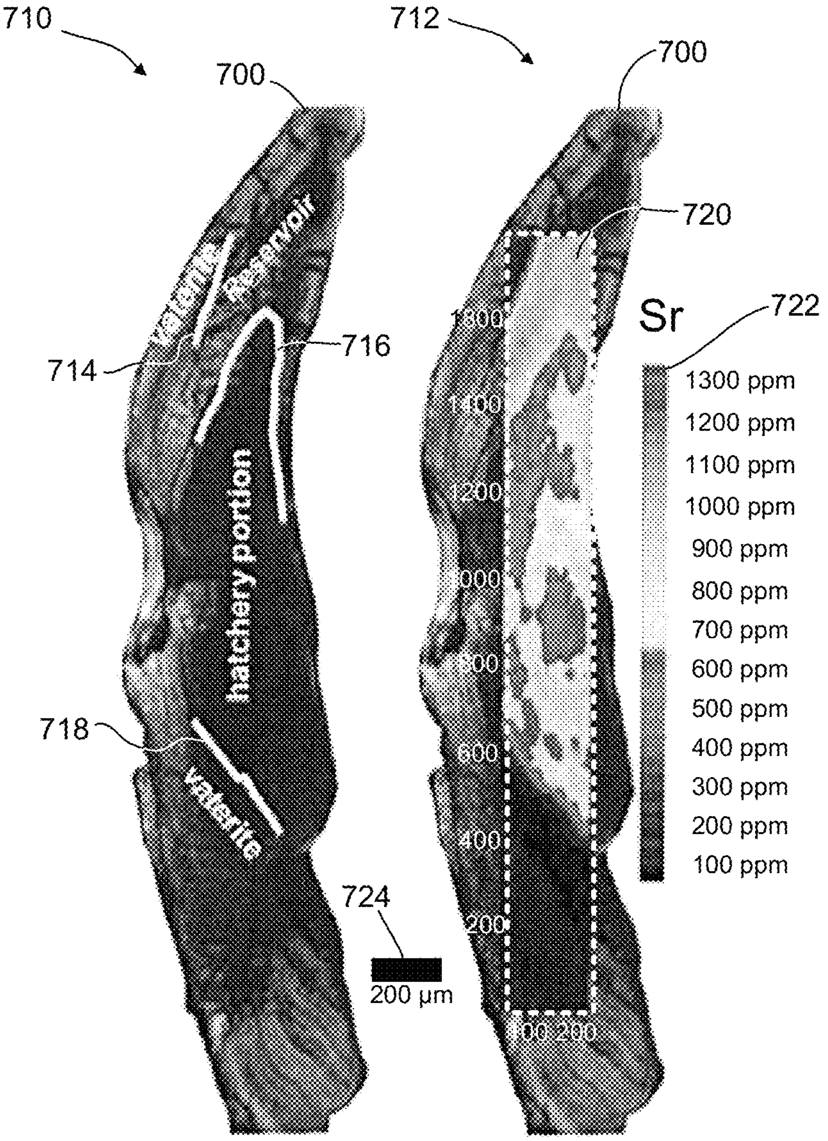
FIG. 7 illustrates two composite images of a sample with user annotations and indicia of correlated spectroscopy data according to one embodiment.

In addition to spectroscopy data, other data may be displayed along with or overlaid on the sample images. For example, FIG. 7 illustrates two composite images 710, 712 of a sample 700 with user annotations and indicia of correlated spectroscopy data according to one embodiment. The two composite images 710, 712 may be displayed separately or together (e.g., side by side) on the display device 324 shown in FIG. 1.

In this example, the sample 700 is an ear bone of a fish and a user has added annotation markings 714, 716, 718 and text on a first image 710 to highlight various anatomical features. For example, a first marking 714 represents a boundary between a "vatente" and a "reservoir" of the fish ear bone, a second marking 716 represents a boundary between the "reservoir" and a "hatchery portion" of the fish ear bone, and a third marking 718 represents a boundary between the "hatchery portion" and a "vaterite" of the fish ear bone.

A second image 712 includes indicia of correlated spectroscopy data 720 within a 2D area of the fish ear bone. In this example, the indicia of spectroscopy data 720 correspond to the measured concentration of Strontium (Sr) within the 2D area, which for illustrative purposes in FIG. 7 is shown within a dashed line. As with the examples shown in FIGS. 5 and 6, certain embodiments use a spectrum of colors to represent variations in the concentration levels and a first legend 722 may be displayed to indicate the correspondence between color and concentration level. As shown in FIG. 7, a second legend 724 may also be displayed to indicate a scale (e.g., distance or length) for the displayed images 710, 712. In this example, indications of the distance or length are also displayed along the horizontal or X direction (e.g., 100 and 200) and the vertical or Y direction (e.g., 200, 400, 600, 800, 1000, 1200, 1400, and 1800) of the 2D area of the indicia of correlated spectroscopy data 720.

Figure 8:
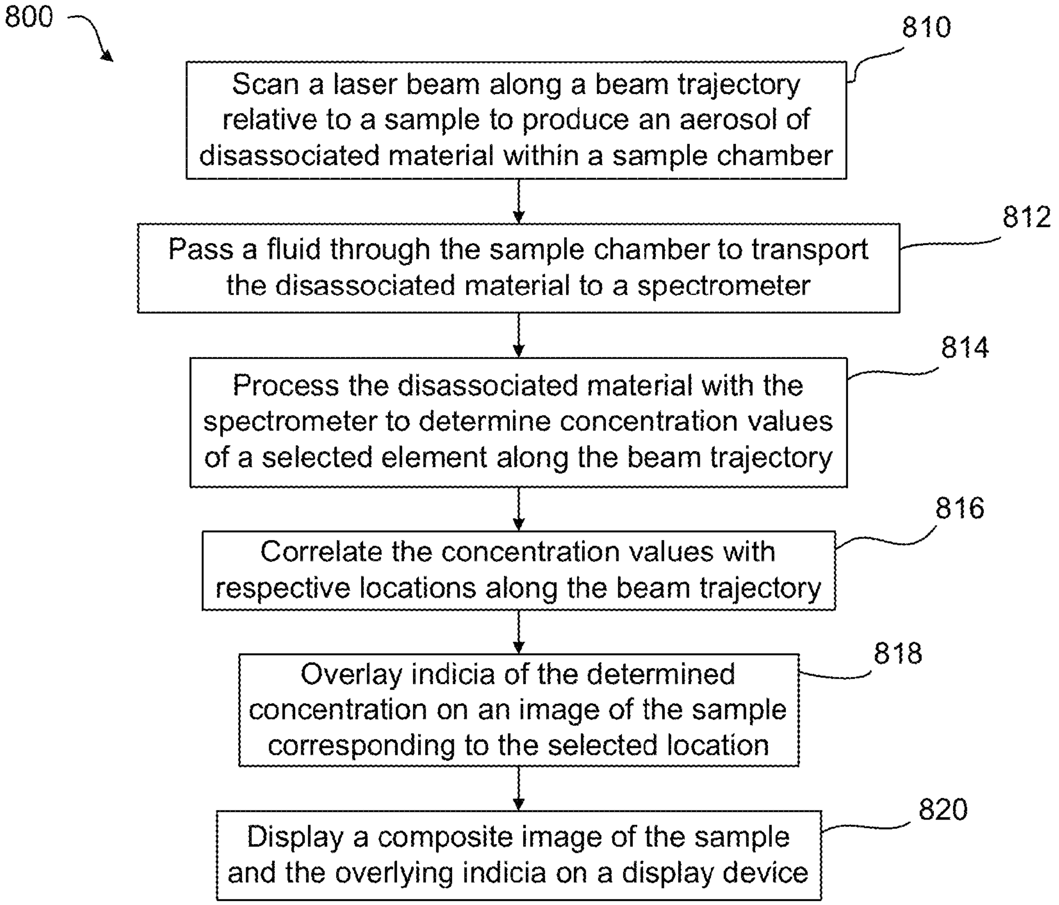
FIG. 8 is a flow chart of a method for displaying spectroscopy data of a sample specimen according to one embodiment.

FIG. 8 is a flow chart of a method 800 for displaying spectroscopy data of a sample specimen according to one embodiment. The method 800 includes scanning 810 a laser beam along a beam trajectory relative to a sample (e.g., in X, Y, and/or Z directions) to produce an aerosol of disassociated material within a sample chamber, and passing 812 a fluid through the sample chamber to transport the disassociated material to a spectrometer. As discussed above, the fluid may include an inert gas such as Argon or Helium. The method 800 also includes processing 814 the disassociated material with a spectrometer to determine concentration values of a selected element along the beam trajectory, and correlating 816 the concentration values with respective locations along the beam trajectory (see, e.g., FIG. 9). As discussed above, the determined concentration values may be in parts-per-million or may be represented by detector responses such as volts, counts, counts per second, frequency, and wavelength. The concentration values may also include ratios such as elemental ratios or isotropic ratios. The method 800 further includes overlaying 818 indicia of the determined concentration on an image of the sample corresponding to the selected location. As discussed below, a user may select whether to display the indicia of the concentration values and/or other layers of information over the image of the sample. In other embodiments, rather than overlaying the indicia, image data in a stored copy of the image of the sample may be replaced with image data corresponding to the indicia of the concentration values. The method 800 further includes displaying 820 a composite image of the sample and the overlying indicia on a display device.

Figure 9:
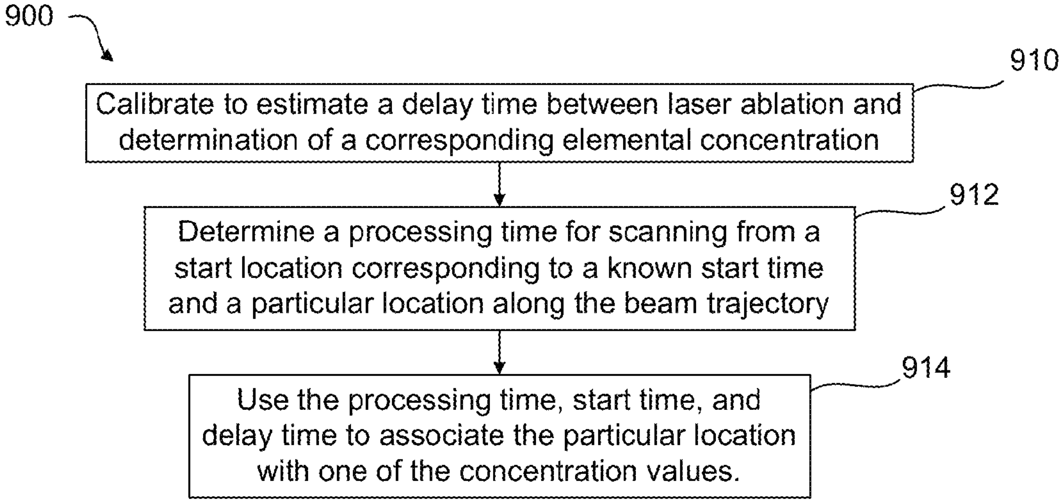
FIG. 9 is a flow chart of a method for correlating the concentration values with respective locations along the beam trajectory according to one embodiment.

FIG. 9 is a flow chart of a method 900 for correlating the concentration values with respective locations along the beam trajectory according to one embodiment. The method 900 includes calibrating 910 the system to estimate a delay time between laser ablation and a determination of a corresponding elemental concentration. The delay time may include one or more delays associated with, for example, directing the laser beam (e.g., using X, Y, and/or Z stages) to a new location along the beam trajectory, commanding a laser source to fire one or more laser pulses at the new location, propagating the one or more laser pulses from the laser source to the sample for disassociating the material, transporting the disassociated from the sample chamber to the spectrometer, and operating the spectrometer so as to analyze the disassociated material and record a concentration value. In certain embodiments, a time stamp is associated with each concentration value that is calculated and recorded. The time stamp may correspond to a time when the measured concentration value is recorded or to a time when the disassociated material used in the calculation is first received at the spectrometer. As discussed below, the time stamps may be compared (after being adjusted for delay) with a start time to associate each concentration value with a respective location along the beam trajectory.

The method 900 further includes determining 912 a processing time for scanning from a start location of the beam trajectory with respect to the surface of the sample to a particular location (e.g., the location currently being correlated) along the beam trajectory. The start location corresponds to a known start time. The method 900 further includes using 914 the processing time, start time, and delay time to associate the particular location with one of the concentration values. In other words, scanning speed or other position data may be used to determine the position of the laser beam along the beam trajectory with respect to the surface of the sample at any given point in time. Based on the calibrated delay, the time stamps may each be associated with a position of the laser beam along the beam trajectory.

Although certain embodiments described herein transport disassociated material to a spectroscope for processing, this disclosure is not so limited. Rather, any type of laser-assisted spectroscopy may be used. For example, laser induced breakdown spectroscopy (LIBS) may be used and the spectroscopy data values may include wavelength values. In LIBS embodiments, scanning the laser beam along the beam trajectory stimulates light emission from the sample. The emitted light comprises one or more wavelengths that are characteristic of respective elements illuminated by the laser beam. The emitted light is directed (e.g., collected by one or more lenses into optical fiber) to one or more spectrometers for determining the one or more wavelength values.

Figure 10:
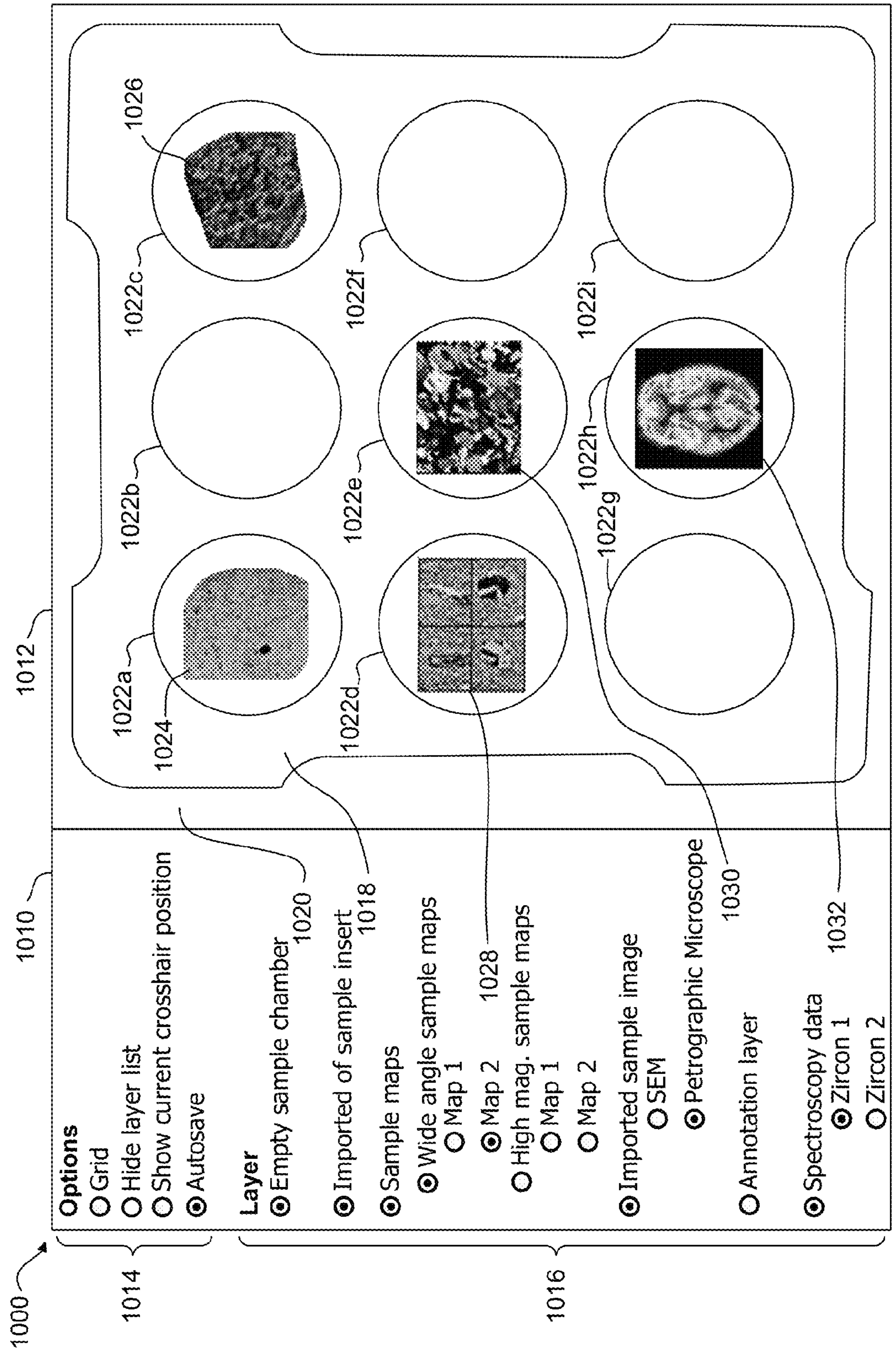
FIG. 10 graphically represents a graphical user interface according to one embodiment.

FIG. 10 graphically represents a graphical user interface 1000 according to one embodiment. The graphical user interface 1000 may be displayed, for example, on the display device 324 shown in FIG. 3. The graphical user interface 1000 includes a user selection section 1010 and a graphic display section 1012. The graphical user interface 1000 provides a layered environment that allows the user to selectively display various layers of information corresponding to one or more samples.

In this example, the user selection section 1010 includes an options list 1014 and a layer list 1016. The options list 1014 allows the user to select (e.g., through hyper text or the displayed graphic buttons) whether to display a grid in the graphic display section 1012 to accurately indicate a scale for objects displayed within the sample chamber, hide the layer list 1016, show a current crosshair position, and autosave a current display configuration.

The layer list 1016 (which the user may selectively display) allows the user to select which layers of information are displayed in the graphic display section 1012. The layers may be configured to at least partially overlay one another and the user may be allowed to select an order for the displayed layers. In the example shown in FIG. 10, a layer including an imported image of a sample insert 1018 is selected by the user to be displayed over an image of an empty sample chamber 1020. Certain embodiments allow the user to select from a plurality of different types of sample chambers 1020 to display, based on a current or desired configuration. The displayed sample chamber 1020 may include an actual image of the sample chamber, a blank grid, or a schematic of the sample chamber.

The imported image of the sample insert 1018 may be provided, for example, from a flatbed scanner or a digital camera. In this example, the sample insert includes nine sections **1022*a*, 1022*b*, 1022*c*, 1022*d*, 1022*e*, 1022*f*, 1022*g*, 1022*h*, 1022*i* for holding respective samples, and the imported image of the sample insert 1018 includes images of samples 1024, 1026 in sections 1022*a*, 1022*c*. Although shown overlaid with other data, samples are also loaded in sections 1022*d*, 1022*e*, 1022*h*. Skilled persons will recognize from the disclosure herein that the sample insert 1018 may be configured to hold a single sample or more than nine samples. Further, in certain embodiments, two or more of the sections 1022*a*, 1022*b*, 1022*c*, 1022*d*, 1022*e*, 1022*f*, 1022*g*, 1022*h*, 1022*i* may display the same image of the same sample so that different layers (e.g., the sample map, SEM/petrographic microscope, annotation, and/or spectroscopy data layers) may be applied to each sample image for a side-by-side comparison of different data for the same sample (e.g., see FIG. 7**).

The layer list 1016 also allows the user to select the display of one or more sample maps, which are a mosaic of images corresponding to adjacent portions of the sample. The sample maps may be generated using one or more camera systems (e.g., such as camera 322 shown in FIG. 3) while the sample is located within the sample chamber. As shown in FIG. 10, the user can select to display wide angle sample maps and/or high magnification sample maps. In certain embodiments, there is no limit on the number of sample maps that can be included and displayed within this layer (e.g., for illustrative purposes both "Map 1" and "Map 2" are shown for each type of sample map). In this example, the user has selected to display a wide angle sample map 1028 (corresponding to "Map 2") in section **1022*d* of the imported sample insert 1018**.

The layer list 1016 also allows the user to select the display of one or more images imported from external (e.g., third party) devices. Such images may be produced by, for example, petrographic microscope systems, SEM systems, or other imaging systems. The images are importable in a wide variety of sample types and may be selectively overlapped one with another. The user may also select the order in which the imported images in this layer overlap one another. In certain embodiments, the imported images may be selectively aligned to stage coordinates using two fiducial points on the image of the sample and corresponding points on another preexisting or imported image. As with the sample maps, there may be no limit on the number of imported sample images that are included and displayed in this layer (e.g., for illustrative purposes SEM and petrographic microscope images are shown for possible display). In addition, or in other embodiments, any image size or image resolution may be imported. In this example, the user has selected to display an imported petrographic microscope image 1030 in section **1022*e* of the imported sample insert 1018**.

The layer list 1016 also allows the user to select to the display of an annotation layer. As discussed above, with respect to FIG. 7, the annotation layer may allow the user to add text and/or graphics (e.g., lines, symbols, or other indicia) over an image of a sample or another portion of the graphic display section 1012. In this example, the user has not selected to include an annotation layer.

The layer list 1016 also allows the user to select the display of spectroscopy data, as described in detail herein. The indicia of the spectroscopy data may be displayed in real time (e.g., as the sample is being scanned by a laser beam). In addition, or in other embodiments, the user may selectively import spectroscopy data or previously correlated indicia of spectroscopy data for display within the graphic display section 1012. In this example, the user has selected to display indicia of spectroscopy data 1032 over an image of a sample ("Zircon 1") displayed in section **1022*h* of the imported sample insert 1018**.

Artisans will recognize from the disclosure herein that other layers may also be used. In certain embodiments, the entire layered environment can be saved to enable the user to load saved environments at a later time and recall all of the information associated with a particular experiment (e.g., scan positions, SEM data, spectrometer raw data, reduced data such as age of the particular sample, and other data used in the experiment). As the user scans across the environment, respective data and data files become available for viewing, which enables traceability of the various aspects of the experiment and reduces or negates the requirement for the user to keep separate records. In certain embodiments, mobile device applications (e.g., for laptop computers, tablet computers, smart phones, or other mobile devices) allow the user to review selected environments at any time.

It will be understood by those having skill in the art that many changes may be made to the details of the above-described embodiments without departing from the underlying principles of the invention. The scope of the present invention should, therefore, be determined only by the following claims.

The invention claimed is:

1. A method for displaying laser-assisted mass spectroscopy data of a sample specimen, the method comprising:

scanning, using a laser processing system, a laser beam along a beam trajectory relative to the sample, wherein the sample is located in a sample chamber during the scanning, and wherein the laser beam disassociates material from the sample along the beam trajectory to produce an aerosol of the disassociated material within the sample chamber;

passing a fluid through the sample chamber to transport the disassociated material to a spectrometer for determining mass spectroscopy data values of a selected element along the beam trajectory;

correlating, using a processor, the mass spectroscopy data values with respective locations of the sample along the beam trajectory; and displaying, on a display device, in real time as the laser beam continues to disassociate the material from the sample along the beam trajectory, an image of at least a portion of the sample including the respective locations along the beam trajectory where the material was disassociated by the laser beam, the image comprising indicia of the mass spectroscopy data values directly displayed on the sample at their correlated locations.

2. The method of claim 1, wherein correlating the mass spectroscopy data values with respective locations of the sample along the beam trajectory comprises:

estimating a delay time between initially directing the laser beam to the sample and a time at which the spectrometer calculates a corresponding mass spectroscopy data value for the selected element;

determining a processing time for scanning the laser beam from a first location to a second location of the sample along the beam trajectory, the first location corresponding to a known start time; and using the processing time, the start time, and the delay time, associating one of the mass spectroscopy data values determined by the spectrometer with the second location of the sample along the beam trajectory.

3. The method of claim 1, wherein the indicia comprise a plurality of colors, wherein each color is associated with a respective range of mass spectroscopy data values.

4. The method of claim 1, wherein the indicia comprise variations in one or more graphical elements selected from the group comprising fill patterns, colors, shades, hues, brightness, text, and symbols.

5. The method of claim 1, further comprising:

using the laser beam to add one or more fiducial marks to the sample for aligning the indicia of the mass spectroscopy data values with their correlated locations.

6. The method of claim 1, further comprising:

adding one or more fiducial marks to the image for aligning the indicia of the mass spectroscopy data values with the image of the sample.

7. The method of claim 1, further comprising:

displaying the image of the sample as a first layer of a composite image; and displaying the indicia of the mass spectroscopy data values as a second layer overlaid on the first layer of the composite image at the correlated locations.

8. The method of claim 7, further comprising:

allowing a user, through a graphical user interface, to selectively display the first layer and the second layer.

9. The method of claim 8, further comprising:

allowing the user, through the graphical user interface, to selectively display one or more third layers selected from group comprising an image of the sample chamber, a sample map comprising a mosaic of images corresponding to adjacent images of the sample, a microscope image of the sample, and user annotations.

10. The method of claim 9, further comprising:

generating the microscope image using a microscope selected from the group comprising a petrographic microscope and a scanning electron microscope.

11. The method of claim 1, wherein the mass spectroscopy data values are selected from the group comprising elemental concentrations, elemental ratios, isotropic ratios, count values, count per second values, voltage values, frequency values, and wavelength values.

12. A laser-assisted mass spectroscopy system, comprising:

a sample chamber for holding a sample specimen;

a laser source for producing a laser beam;

a scanning subsystem for scanning the laser beam along a beam trajectory relative to the sample, wherein the laser beam disassociates material from the sample along the beam trajectory to produce an aerosol of the disassociated material within the sample chamber, and wherein a fluid passing through the sample chamber transports the disassociated material to a spectrometer for determining mass spectroscopy data values of a selected element along the beam trajectory;

a processor for controlling the scanning subsystem and for correlating the mass spectroscopy data values with respective locations of the sample along the beam trajectory; and a display device for displaying, in real time as the laser beam continues to disassociate the material from the sample along the beam trajectory, an image of at least a portion of the sample including the respective locations along the beam trajectory where the material was disassociated by the laser beam, the image comprising indicia of the mass spectroscopy data values directly displayed on the sample at their correlated locations.

13. The system of claim 12, wherein the scanning subsystem comprises one or more beam steering optics controlled by the processor.

14. The system of claim 12, wherein the scanning subsystem comprises one or more motion stages controlled by the processor.

15. The system of claim 12, wherein the processor correlates the mass spectroscopy data values with respective locations of the sample along the beam trajectory by:

estimating a delay time between initially directing the laser beam to the sample and a time at which the spectrometer calculates a corresponding mass spectroscopy data value for the selected element;

determining a processing time for scanning the laser beam from a first location to a second location of the sample along the beam trajectory, the first location corresponding to a known start time; and using the processing time, the start time, and the delay time, associating one of the mass spectroscopy data values determined by the spectrometer with the second location of the sample along the beam trajectory.

16. The system of claim 12, wherein the indicia comprise a plurality of colors, wherein each color is associated with a respective range of mass spectroscopy data values.

17. The system of claim 12, wherein the indicia comprise variations in one or more graphical elements selected from the group comprising fill patterns, colors, shades, hues, brightness, text, and symbols.

18. The system of claim 12, wherein the processor is further configured to control the laser source and scanning subsystem to add one or more fiducial marks to the sample for aligning the indicia of the mass spectroscopy data values with their correlated locations.

19. The system of claim 12, wherein the processor is further configured to add one or more fiducial marks to the image for aligning the indicia of the mass spectroscopy data values with the image of the sample.

20. The system of claim 12, wherein the processor is further configured to:

display, on the display device, the image of the sample as a first layer of a composite image; and display, on the display device, the indicia of the mass spectroscopy data values as a second layer overlaid on the first layer of the composite image at the correlated locations.

21. The system of claim 20, wherein the processor is further configured to:

allow a user, through a graphical user interface, to selectively display the first layer and the second layer.

22. The system of claim 21, wherein the processor is further configured to:

allow the user, through the graphical user interface, to selectively display one or more third layers selected from group comprising an image of the sample chamber, a sample map comprising a mosaic of images corresponding to adjacent images of the sample, a microscope image of the sample, and user annotations.

23. The system of claim 22, further comprising:

a microscope to generate the microscope image, the microscope selected from the group comprising a petrographic microscope and a scanning electron microscope.

24. The system of claim 12, wherein the mass spectroscopy data values are selected from the group comprising elemental concentrations, elemental ratios, isotropic ratios, count values, count per second values, voltage values, frequency values, and wavelength values.

25. A laser-assisted mass spectroscopy system, comprising:

means for scanning a laser beam along a beam trajectory relative to a sample, wherein the sample is located in a sample chamber during the scanning, and wherein the laser beam disassociates material from the sample along the beam trajectory to produce an aerosol of the disassociated material within the sample chamber;

means for passing a fluid through the sample chamber to transport the disassociated material to a spectrometer for determining mass spectroscopy data values of a selected element along the beam trajectory;

means for correlating the mass spectroscopy data values with respective locations of the sample along the beam trajectory; and means for displaying, while simultaneously continuing to determine mass spectroscopy data, an image of at least a portion of the sample including the respective locations along the beam trajectory where the material was disassociated by the laser beam, the image comprising indicia of the mass spectroscopy data values directly displayed on the sample at their correlated locations.

26. A method for displaying laser-assisted mass spectroscopy data of a sample specimen, the method comprising:

scanning, using a laser processing system, a laser beam along a beam trajectory relative to the sample;

generating, using one or more mass spectrometers, mass spectroscopy data values along the beam trajectory;

correlating, using a processor, the mass spectroscopy data values with respective locations of the sample along the beam trajectory; and displaying, on a display device, while simultaneously continuing to generate mass spectroscopy data values, an image of at least a portion of the sample including the respective locations along the beam trajectory, the image comprising indicia of the mass spectroscopy data values directly displayed on the sample at their correlated locations.

27. The method of claim 26, wherein the sample is located in a sample chamber during the scanning, and wherein the laser beam disassociates material from the sample along the beam trajectory to produce an aerosol of the disassociated material within the sample chamber, and wherein generating the mass spectroscopy data values comprises passing a fluid through the sample chamber to transport the disassociated material to the one or more mass spectrometers for determining mass spectroscopy data values of a selected element along the beam trajectory.

* * * * *